(12) United States Patent
Satran et al.

(10) Patent No.: US 6,536,996 B2
(45) Date of Patent: Mar. 25, 2003

(54) CUTTING TOOL (75) Inventors: Amir Satran, Kfar Vradim (IL); Yuri Men, Haifa (IL)

(73) Assignee: Iscar Ltd. (IL)

( * ) Notice: Subject to any disclaimer, the term of this patent is extended or adjusted under 35 U.S.C. 154(b) by 0 days.

(21) Appl. No.: 09/994,981

(22) Filed: Nov. 28, 2001

(65) Prior Publication Data

US 2002/0037199 A1 Mar. 28, 2002

Related U.S. Application Data (63) Continuation of application No. PCT/IL00/00197, filed on Mar. 29, 2000.

(30) Foreign Application Priority Data

Nov. 28, 2000 (IL) .................................................. 139957

(51) Int. Cl.⁷ ............................................. B23C 5/22
(52) U.S. Cl. .......................... 407/34; 407/42; 407/54; 407/113
(58) Field of Search .............................. 407/34, 35, 40, 407/42, 54, 48, 62, 65, 103, 113, 114

(56) References Cited

U.S. PATENT DOCUMENTS

| | | | |
|---|---|---|---|
| 3,629,919 A | * 12/1971 | Trerarrow, Jr. .............. | 407/103 |
| 4,209,047 A | * 6/1980 | Weill ...................... | 407/103 X |
| 4,525,110 A | 6/1985 | Stojanovski ................ | 407/40 |
| 4,808,045 A | 2/1989 | Tsujimura et al. .......... | 408/204 |
| 4,852,622 A | * 8/1989 | Ericksson ............... | 407/103 X |
| 5,221,162 A | * 6/1993 | Okawa ........................ | 407/40 |
| 5,542,795 A | 8/1996 | Mitchell ..................... | 407/35 |
| 5,836,723 A | * 11/1998 | Von Haas et al. .......... | 407/107 |
| 6,102,630 A | 8/2000 | Flolo .......................... | 407/103 |
| 6,146,061 A | * 11/2000 | Larsson ..................... | 407/103 |

FOREIGN PATENT DOCUMENTS

JP     8206910     8/1996

* cited by examiner

Primary Examiner—Henry Tsai
(74) Attorney, Agent, or Firm—Pennie & Edmonds LLP (57) ABSTRACT

A cutting tool (20) comprising a tool body (22) and two cutting inserts (24) mounted therein. An insert receiving pocket (26) of the tool body has a pocket base wall (30). An indentation (32) that opens to the pocket base wall has a lower wall (34) that is bounded by first (36), second (38), third (40) and fourth (44) side walls. The cutting insert has an insert base wall (68). A protuberance (69) extends downwards from the insert base wall and has a lower wall (70) bounded by first (72), second (73), third (74) and fourth (75) lateral walls. The insert base wall abuts the pocket base wall, the first lateral wall abuts the first side wall, the third lateral wall abuts the third side wall, the first lateral wall is distanced from a center line by a first distance D1, the cutting edge close to the center line is distanced therefrom by a second distance D2 where the first distance is at least three times greater than the second distance and where a relief surface (63) of the cutting insert is relieved from the insert receiving pocket.

31 Claims, 8 Drawing Sheets

CUTTING TOOL

This is a continuation of application No. PCT/IL00/00197, field Mar. 29, 2000.

FIELD OF THE INVENTION

The present invention relates to a cutting tool employing indexable cutting inserts and in particular a ball nose end mill employing such inserts.

BACKGROUND OF THE INVENTION

End mills employing cutting inserts mounted at the front end of the tool are known in the art. The end mills can be used in several types of applications depending on the configuration of the cutting inserts mounted therein. The cutting inserts may present a peripheral cutting edge for side milling, a front cutting edge for face milling and a curved cutting edge of a so-called "ball-nose" end mill for various copying applications.

In a ball-nose end mill or in another type of end mill where it is often required that the tool be able to cut up to the tool axis as shown, for example in U.S. Pat. No. 4,525,110 to Stojanovski, one cutting insert is located so as to present a cutting edge that extends to the axis of the tool and another cutting insert is located so as to present another cutting edge spaced away from the axis of the tool. The fact that in such cases two identical cutting inserts are located at different distances from the axis, can give rise to balancing problems.

When locating two cutting inserts in the front end of a ball-nose end mill another problem arises. This problem involves the fact that the cutting inserts are subjected to cutting forces in various directions, such forces tend to withdraw the cutting inserts from their pockets. A solution to this problem can be found, for example, in U.S. Pat. No. 4,808,045 to Tsujimura et al. In '045, a groove of a channel-shaped cross-section is formed in a central portion of the lower surface of the insert. The side walls of the groove form abutment surfaces which receive component forces of the cutting feed from the inner and outer peripheral cutting edges. However, in '045 the cutting inserts do not reach the axis of the tool.

Another solution of giving additional support to the cutting inserts can be found, for example, in U.S. Pat. No. 5,542,795 to Mitchell. In '795, each cutting insert 36 is provided with an integrally formed rail 50 formed on the back face 40 of the cutting insert. A bottom wall 28 of each insert seat 26 includes a longitudinally oriented slot 32 for receiving the rail 50. Since, when tightening the locking screw 53, the cutting insert is pressed also against a sidewall 30 of the insert seat 26, the cutting tool of '795 is not suitable for mounting identical cutting inserts near the axis of the tool since they require a sufficient thickness of radial support by the sidewall 30. It is understood that if the radial support between the two identical cutting inserts is made thin in order to locate the cutting inserts as close as possible to the axis of the tool, then the central portion of the tool becomes week.

In Japanese patent JP 8206910 to Takuya it is shown how to retain a cutting insert having a stepped convex part 18 in its bottom within a stepped concave part 27 formed inside the insert seat. However, '910 does not teach how to retain two cutting inserts that cut till the axis of the tool.

It is the object of the present invention to provide an end mill that significantly reduces or overcomes the aforementioned disadvantages.

It is a further object of the present invention to provide a ball-nose end mill having two identical and indexable cutting inserts.

SUMMARY OF THE INVENTION

In accordance with the present invention there is provided a cutting tool (20, 82) comprising a tool body (22, 22') and two cutting inserts (24, 24a, 24b) mounted therein;

the tool body having two insert receiving pockets (26, 26a, 26b) substantially symmetrically located with respect to a center line of the tool body, each of the two insert receiving pockets comprising:
  a pocket base wall (30),
  an indentation (32) opening to the base wall, the indentation having a lower wall (34) that is connected to at least three side walls, a first side wall (36) of said at least three side walls being substantially longitudinally directed with respect to the center line, a second side wall (38) of said at least three side walls being parallel to the first side wall and located more distantly relative to the first side wall with respect to the center line of the tool body, a third side wall (40) of said at least three side walls being transversely directed with respect to the first and second side walls,
  a threaded bore (54) extending through the lower wall (34) of the indentation (32);

each of the two cutting inserts (24, 24a, 24b) comprising:
  a rake surface (62), an insert base wall (68) and a peripheral relief surface (63) connecting the rake surface and the base wall, and cutting edges (59, 60) defined between the rake and relief surfaces,
  a protuberance (69) extending downwardly from the insert base wall (68) and away from the rake surface (62), the protuberance having a lower wall (70) that is connected to four lateral walls, each lateral wall being connected to an adjacent lateral wall, the four lateral walls being connected to the insert base wall, a first lateral wall (72) of the four lateral walls being substantially longitudinally directed with respect to the center line, a second lateral wall (73) of said four lateral walls being parallel to the first lateral wall, a third lateral wall (74) of the four lateral walls being transversely directed with respect to the first and second lateral walls, a fourth lateral wall (75) of the four lateral walls being parallel to the third lateral wall,
  a through bore (58), having an axis (B), extending between the rake surface (62) and the lower wall (70);

each cutting insert is retained in a respective insert receiving pocket by a clamping screw (78) passing through the through bore (58) of the cutting insert and threadingly engaging the threaded bore (54), the insert base wall (68) abuts the pocket base wall (30) of the insert receiving pocket, the first lateral wall (72) of the protuberance abuts the first side wall (36) of the indentation (32), and the third lateral wall (74) of the protuberance (69) abuts the third side wall (40) of the indentation, in a cross section taken perpendicular to the center line and passing through the threaded bores, the first lateral wall of the protuberance is distanced from the center line by a first distance D1 and the cutting edges are distanced from the center line by a second distance D2 and a third distance D3, where the third distance D3 is greater than the second distance D2, where the first distance D1 is at least three times greater than the second distance D2, and where the relief surface (63) is relieved from the insert receiving pocket (26, 26a, 26b).

Typically, the indentation (32) of the insert receiving pocket (26) is bounded by the first, the second, the third and a fourth side walls (36, 38, 40, 44), the first and the second side walls (36, 38) are parallel to each other and substantially longitudinally directed with respect to the center line, the third and the fourth side walls (40, 44) are parallel to each other and transversely directed with respect to the first and second side walls.

Preferably, the two cutting inserts (24) are identical.

According to a first embodiment of the present invention, the cutting tool having rotational symmetry with respect to the center line.

According to a second embodiment of the present invention, the two cutting inserts (24a, 24b) having mirror symmetry with respect to the center line in a top view of the cutting inserts.

Preferably, each cutting insert (24, 24a, 24b) has 180° rotational symmetry around the axis of the through bore (58).

If desired, the indentation (32) is completely enclosed by four side walls (36, 38, 40, 44).

Typically, the first and second lateral walls (72, 73) of the protuberance (69) are perpendicular to the third and fourth lateral walls (74, 75) of the protuberance and the first and second side walls of the indentation (32) are perpendicular to the third and fourth side walls of the indentation.

Further typically, the first and second lateral walls (72, 73) of the protuberance are perpendicular to the insert base wall (68).

Further typically, the third and fourth lateral walls (74, 75) of the protuberance are perpendicular to the insert base wall (68).

Still further typically, the first and second side walls (36, 38) of the indentation are perpendicular to the pocket base wall (30).

Still yet further typically, the third and fourth side walls (40, 44) of the indentation are perpendicular to the pocket base wall (30).

In accordance with the present invention there is provided a tool body (22, 22') having two insert receiving pockets (26, 26a, 26b) substantially symmetrically located with respect to a center line of the tool body, each of the two insert receiving pockets comprising:

a pocket base wall (30), an indentation (32) opening to the base wall, the indentation having a lower wall (34) that is connected to at least three side walls, a first side wall (36) of said at least three side walls being substantially longitudinally directed with respect to the center line, a second side wall (38) of said at least three side walls being parallel to the first side wall and located more distantly relative to the first side wall with respect to the center line of the tool body, a third side wall (40) of said at least three side walls being transversely directed with respect to the first and second side walls, a threaded bore (54) extending through the lower wall (34) of the indentation.

Preferably, at least one of the insert receiving pockets having a pocket side wall (27) substantially parallel to the center line and adjacent thereto, in a cross section taken perpendicular to the center line and passing through the threaded bores, the first side wall (36) of the indentation (32) is distanced from the center line by a fourth distance D4 and the pocket side wall (27) is distanced from the center line a fifth distance D5, where the fourth distance D4 is at least three times greater than the fifth distance D5.

According to a first embodiment of the present invention, the insert receiving pockets are rotationally symmetrical with respect to the center line.

According to a second embodiment of the present invention, the insert receiving pockets having substantially mirror symmetry with respect to the center line in a top view of the insert receiving pockets.

According to the present invention there is provided a cutting insert (24, 24a, 24b) comprising:

a rake surface (62), an insert base wall (68) and a peripheral relief surface (63) connecting the rake surface and the base wall, and cutting edges (59, 60) defined between the rake and relief surfaces, a protuberance (69) extending downwardly from the insert base wall (68) and away from the rake surface (62), the protuberance having a lower wall (70) that is connected to four lateral walls, each lateral wall being connected to an adjacent lateral wall, the four lateral walls being connected to the insert base wall, a first lateral wall (72) of the four lateral walls being substantially longitudinally directed with respect to the center line, a second lateral wall (73) of said four lateral walls being parallel to the first lateral wall, a third lateral wall (74) of the four lateral walls being transversely directed with respect to the first and second lateral walls, a fourth lateral wall (75) of the four lateral walls being parallel to the third lateral wall, a through bore (58), having an axis (B), extending between the rake surface (62) and the lower wall (70).

Preferably, the cutting insert having 180° rotational symmetry around the axis of the through bore.

Typically, each of the cutting edges having a straight portion connected to a rounded portion.

BRIEF DESCRIPTION OF THE DRAWINGS

For a better understanding of the present invention and to show how the same may be carried out in practice, reference will now be made to the accompanying drawings, in which.

DETAILED DESCRIPTION OF THE INVENTION

Attention is drawn to FIGS. 1 to 8. As shown, a cutting tool 20 having an axis A comprises a tool body 22 and two cutting inserts 24 mounted therein. The tool body 22 has two longitudinally extending insert receiving pockets 26 in a front portion 28 of the tool body. The insert receiving pockets are rotationally symmetrically arranged with respect to the axis A. The two insert receiving pockets and the two cutting inserts are identical and therefore only one of them will be described.

Figure 1:
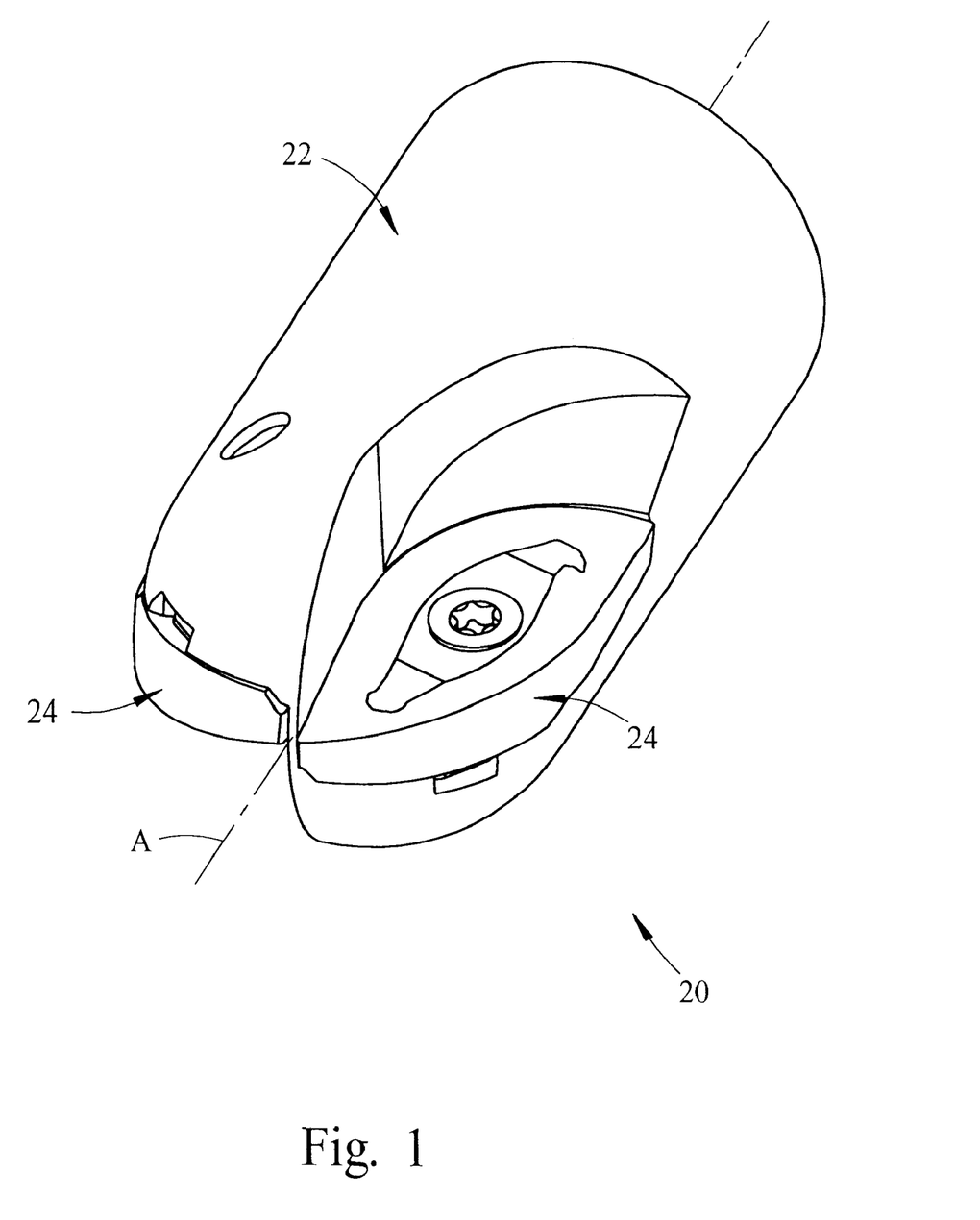
FIG. 1 is a perspective view of a cutting tool according to the present invention.
Figure 2:
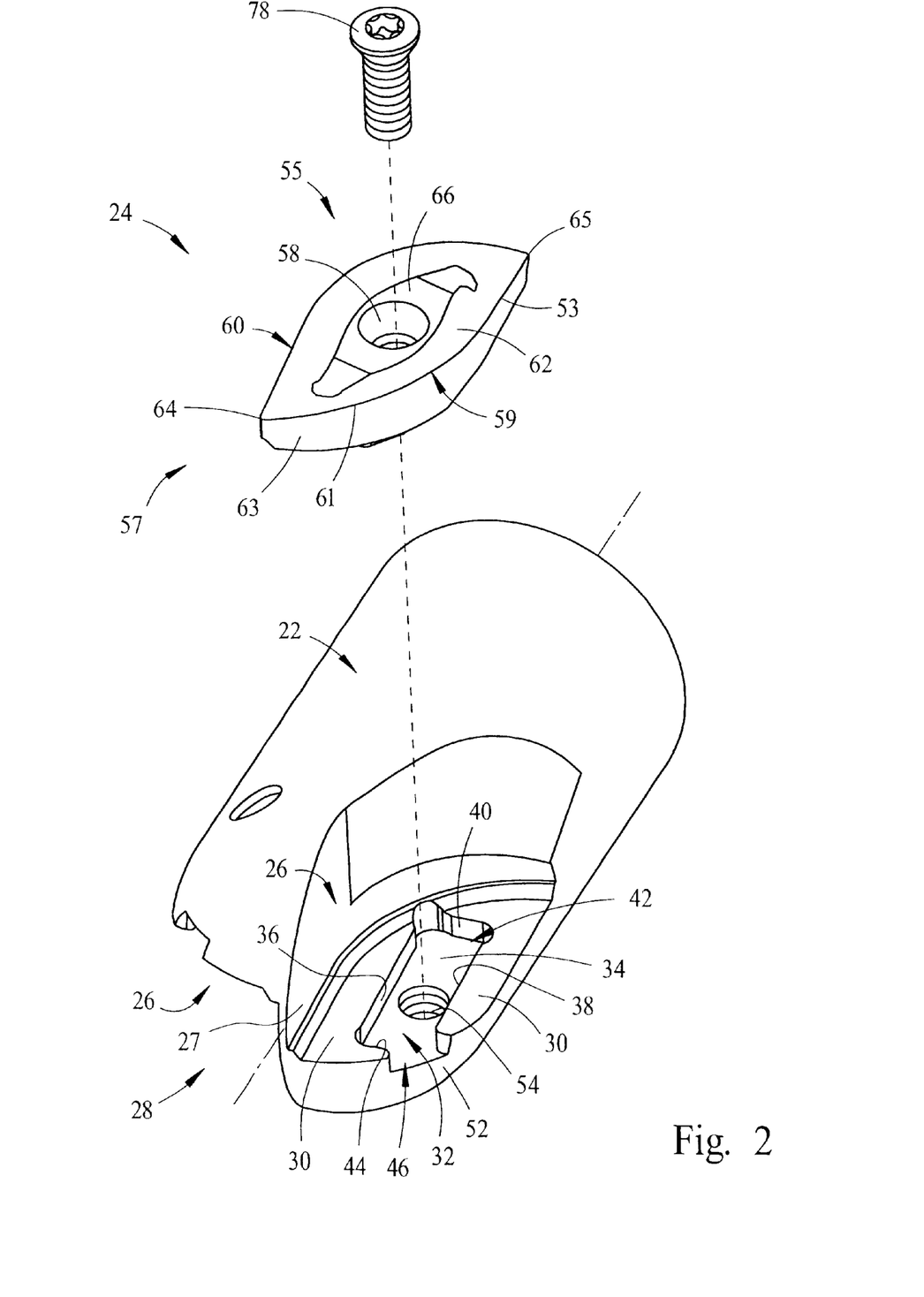
FIG. 2 is an exploded view of the cutting tool of FIG. 1.
Figure 3:
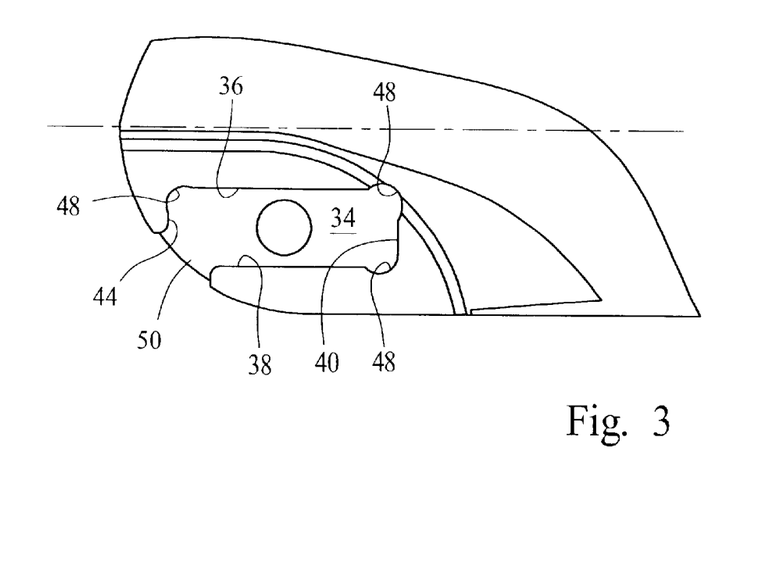
FIG. 3 is a top view of the insert receiving pocket of FIG. 2.
Figure 4:
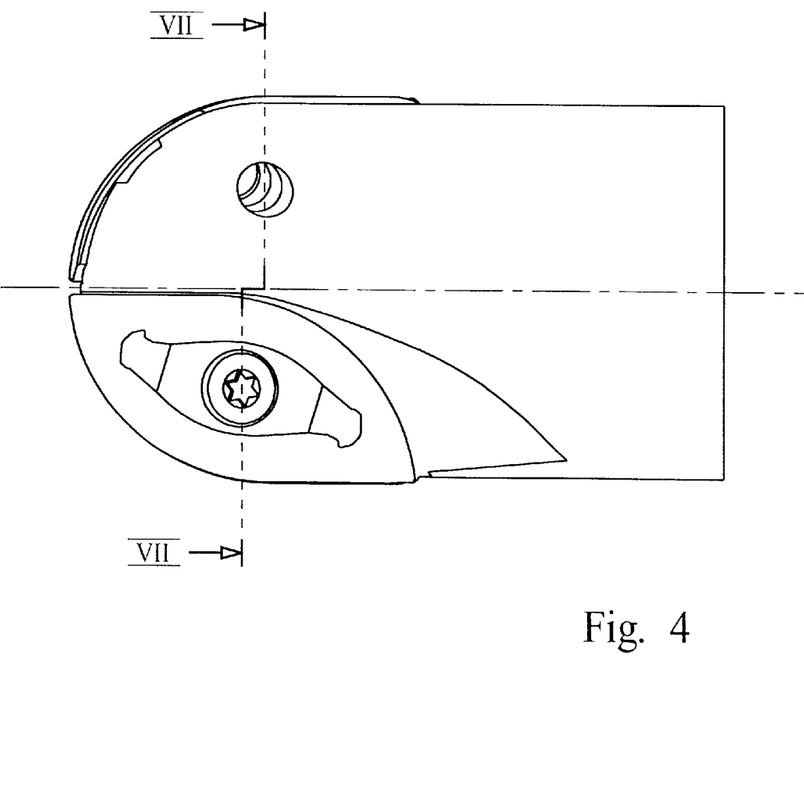
FIG. 4 is a top view of the cutting tool of FIG. 1.
Figure 5:
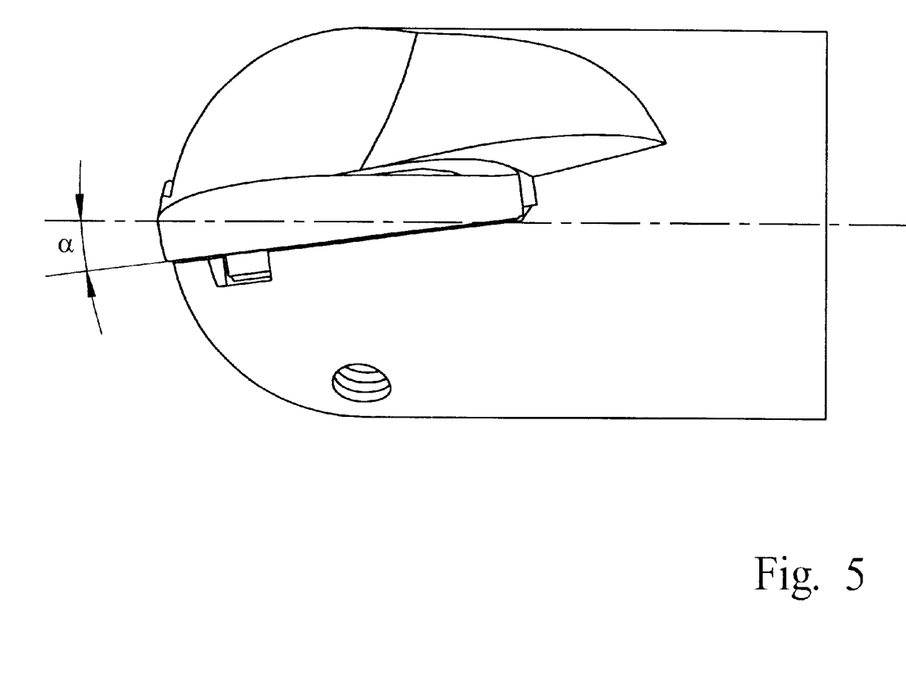
FIG. 5 is a side view of the cutting tool of FIG. 1.
Figure 6:
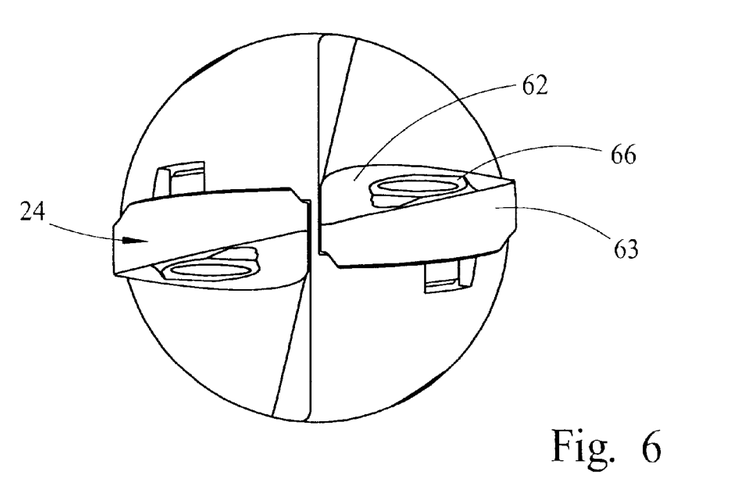
FIG. 6 is a front view of the cutting tool of FIG. 1.

The insert receiving pocket 26 has a pocket base wall 30 that is forwardly downwardly slanted at an acute angle α with respect to the axis A as seen in a side view of the cutting tool 20. The pocket base wall 30 constitutes a tangential abutment surface of the insert receiving pocket 26.

An indentation 32 in the insert receiving pocket 26 opens to the pocket base wall 30 generally symmetrically with respect to the center thereof. The indentation has a lower wall 34 bounded by two pairs of side walls. A first pair of side walls comprising a first side wall 36, close to the axis A, and a second side wall 38, located radially further than the first side wall. The side walls 36 and 38 are substantially longitudinally directed, parallel to each other and constitute radial abutment surfaces.

The second pair of side walls comprising a third side wall 40, at the rear portion 42 of the indentation and a fourth side wall 44 at the forward portion 46 of the indentation. The side walls 40 and 44 are substantially radially directed, parallel to each other and constitute axial abutment surfaces. As can be clearly seen in FIG. 3, the four side walls 36, 38, 40 and 44 form a shape of a rectangle between them. Adjacent side walls are connected by a stress relief groove 48. The side walls 38 and 44 are separated by an opening 50 such that the lower wall 34 reaches the peripheral face 52 of the tool body 22. A threaded bore 54 in the center of the indentation extends through the lower wall 34 substantially perpendicular to the pocket base wall 30. According to a preferred embodiment of the present invention, the side walls 36 and 38 are perpendicular to the side walls 40 and 44. Also in accordance with a preferred embodiment of the present invention, the side walls 36, 38, 40 and 44 are perpendicular to the pocket base wall 30.

Figure 8:
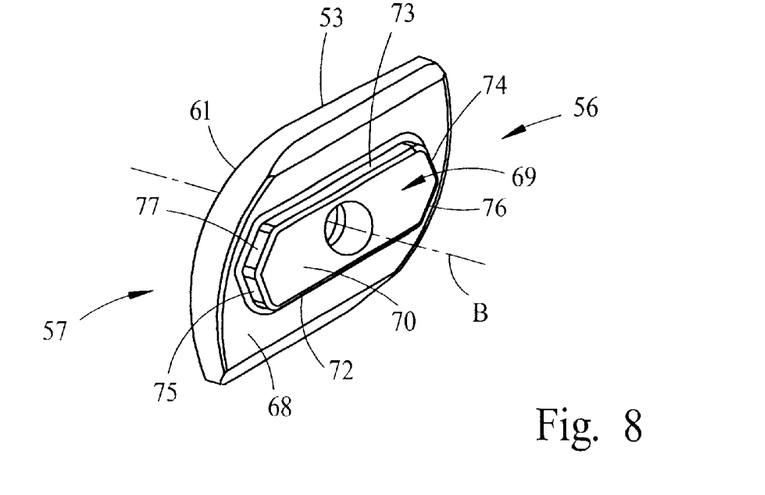
FIG. 8 is a bottom perspective view of the cutting insert of FIG. 1.

The cutting insert 24 has a top surface 55, a bottom surface 56 and a side surface 57 extending therebetween. A centrally located through bore 58, having an axis of symmetry B, extends between the top surface 55 and the bottom surface 56. The cutting insert has 180° rotational symmetry around the axis B and two identical cutting edges 59 and 60. Each cutting edge is defined between a rake surface 62 and a relief surface 63. Each cutting edge has a straight portion 53 merging with a rounded portion 61. The two cutting edges meet at cutting corners 64 and 65. The rake surface 62 extends along the entire circumference of the top surface and is associated with the cutting edges 59, 60 and the cutting corners 64, 65. A centrally located elevation 66 that constitutes chip control means extends inwardly from the rake surface 62 and upwardly away from the bottom surface 56.

The bottom surface 56 has an insert base wall 68 that is perpendicular to the axis B and constitutes a tangential abutment surface of the cutting insert. A protuberance 69 extends downwardly from the insert base wall 68 and away from the rake surface 62. The design of the location of the protuberance 69 with respect to the insert base wall 68 is such that it ensures large abutment surfaces especially in the front and rear portions of the insert base wall 68 where a large abutment surface is required for resisting tangential cutting forces acting on the cutting insert during machining. The protuberance 69 has a lower wall 70 that is connected to a lower portion of two pairs of upwardly extending lateral walls. An upper portion of the lateral walls is connected to the insert base wall 68. A first pair of lateral walls comprising a first lateral wall 72 and a second lateral wall 73. The lateral walls 72 and 73 are substantially longitudinally directed, parallel to each other and constitute radial abutment surfaces. A second pair of lateral walls comprising a third lateral wall 74 and a fourth lateral wall 75. The lateral walls 74 and 75 are parallel to each other, transversely directed with respect to the lateral walls 72 and 73 and constitute axial abutment surfaces. The first lateral wall 72 merges smoothly with the fourth lateral wall 75 and the second lateral wall 73 merges smoothly with the third lateral wall 74. The first lateral wall 72 is connected to the third lateral wall 74 via a first transverse side wall 76 transverse to the first and third lateral walls and the second lateral wall 73 is connected to the fourth lateral wall 75 via a second transverse lateral wall 77 transverse to the second and fourth lateral walls.

As best seen in FIG. 8, the upper portions of the lateral walls 72–77 are all connected to the insert base wall 68 such that the protuberance 69 is completely surrounded by the insert base wall 68. Furthermore, the lower wall 70 of the protuberance 69 fully surrounds the through bore 58 such that the insert base wall 68 is uninterrupted by the through bore 58 while, as seen in FIG. 2, the lower wall 34 of the indentation 32 fully surrounds the threaded bore such that the pocket base wall 30 is uninterrupted by the threaded bore 54.

In the assembled position of the cutting tool 20 each of the cutting inserts 24 is retained within an insert receiving pocket 26 by a clamping screw 78 that passes through the through bore 58 of the cutting insert and threadingly engages the threaded bore 54 in the insert receiving pocket 26. In this position, the tangential abutment surface 68 of the cutting insert abuts the tangential abutment surface 30 of the insert receiving pocket, the first lateral wall 72 abuts the first side wall 36 and the third lateral wall 74 abuts the third side wall 40. The lower wall 70 and the relief surface 63 of the cutting insert remain unabutted.

Figure 7:
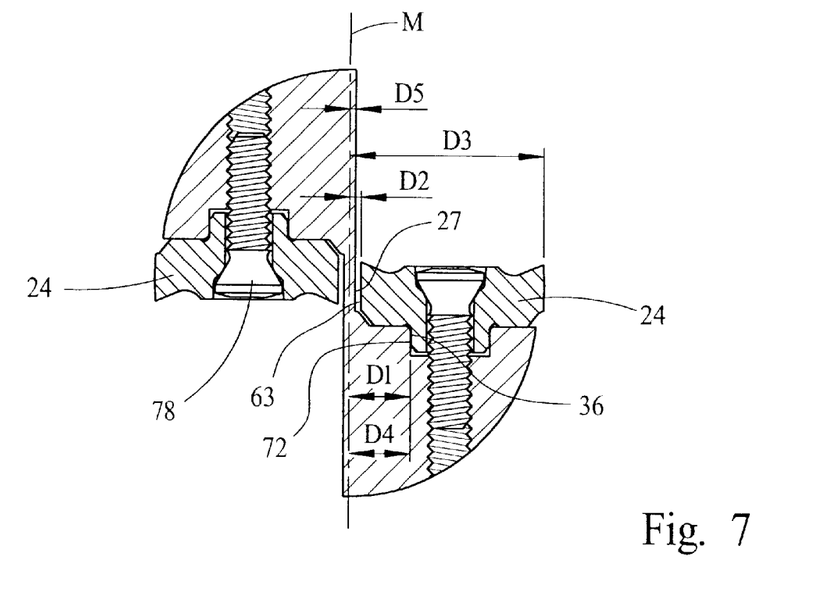
FIG. 7 is a front cross-sectional view along line VII—VII in FIG. 4 taken along the axes of the clamping screws.

The advantages of the cutting tool 20 will now be described. As was already mentioned, when locating two identical cutting inserts in the front portion of a ball-nose end mill it is desired to locate the cutting inserts close to the axis of the tool whilst maintaining required radial support for each of the cutting inserts. As seen in FIG. 7, since the radial abutment surface of each cutting insert is found on a protuberance that is generally centrally located with respect to the insert base wall 68 and not adjacent or in a continuation of the relief surfaces, the radial abutment surface of the insert receiving pocket is spaced a first distance D1 from a rotational symmetry plane M, constituting a center line, of the cutting tool 20 instead of being spaced a second distance D2 therefrom, as would have been in a case of prior art inserts where the radial abutment surface of each cutting insert is found on or near a continuation of the relief surfaces of the cutting edges. The first distance D1 is much greater than the second distance D2, therefore, the tool body of the present invention is more rigid than a conventional tool and is capable of withstanding higher radially directed forces. Usually, the first distance D1 is at least three times greater than the second distance D2. According to a specific embodiment of the present invention, the first distance D1 equals to 5 mm and the second distance D2 equals to 0.5 mm.

Another advantage of the cutting tool according to the present invention arises from the fact that the cutting insert has a protuberance that is retained within an indentation in the insert receiving pocket. This structure provides greater support to the cutting insert against cutting forces that tend to withdraw the cutting insert from its pocket as will be described below.

The tool body 22 and the cutting insert 24 are designed so that when the protuberance 69 is retained within the indentation 32, the cutting insert is abutted in radial, axial and tangential directions, so that the tangential abutment surface 68 abuts the tangential abutment surface 30, the first lateral wall 72 abuts the first side wall 36 and the third lateral wall 74 abuts the third side wall 40. In this position, the unabutted radial and axial abutment surfaces of the cutting insert are spaced only a few hundredths of a mm from the unabutted radial and axial abutment surfaces of the insert receiving pocket. That is, the second lateral wall 73 does not abut the second side wall 38 and the fourth lateral wall 75 does not abut the fourth side wall 44.

If desired, all the lateral walls of the protuberance are ground thereby enabling better abutment of the protuberance 69 within the indentation 32. The spacings between the unabutted radial and axial abutment surfaces of the cutting insert and the insert receiving pocket are practically made in the range of 0.005 to 0.02 mm.

If the cutting insert is subjected to very strong outwardly directed radial forces that tend to separate the first lateral wall 72 from the first side wall 36 despite of the pressure applied by the clamping screw 78 then, in this position, the second lateral wall 73 abuts the second side wall 38 before the clamping screw is excessively bent, thereby enabling adequate abutting of the cutting insert against outwardly directed radial forces without overloading the clamping screw.

In the same manner, if the cutting insert is subjected to very strong forwardly directed axial forces that tend to separate the third lateral wall 74 from the third side wall 40 despite of the pressure applied by the clamping screw 78 then, in this position, the fourth lateral wall 75 abuts the fourth side wall 44 before the clamping screw is excessively bent, thereby enabling adequate abutting of the cutting insert against forwardly directed axial forces without overloading the clamping screw.

In the embodiment shown in FIGS. 1 to 8, the indentation 32 has an opening 50 for the ease of manufacturing of the indentation. The larger the opening the smaller the fourth side wall 44 and the size of the pocket base wall 30 adjacent the fourth side wall. Usually, the forwardly directed axial forces applied on the cutting insert are of a smaller magnitude than the rearwardly directed axial forces applied thereon, thereby, the axial abutment presented by the side wall 44 is suffice.

Figures 9, 10:
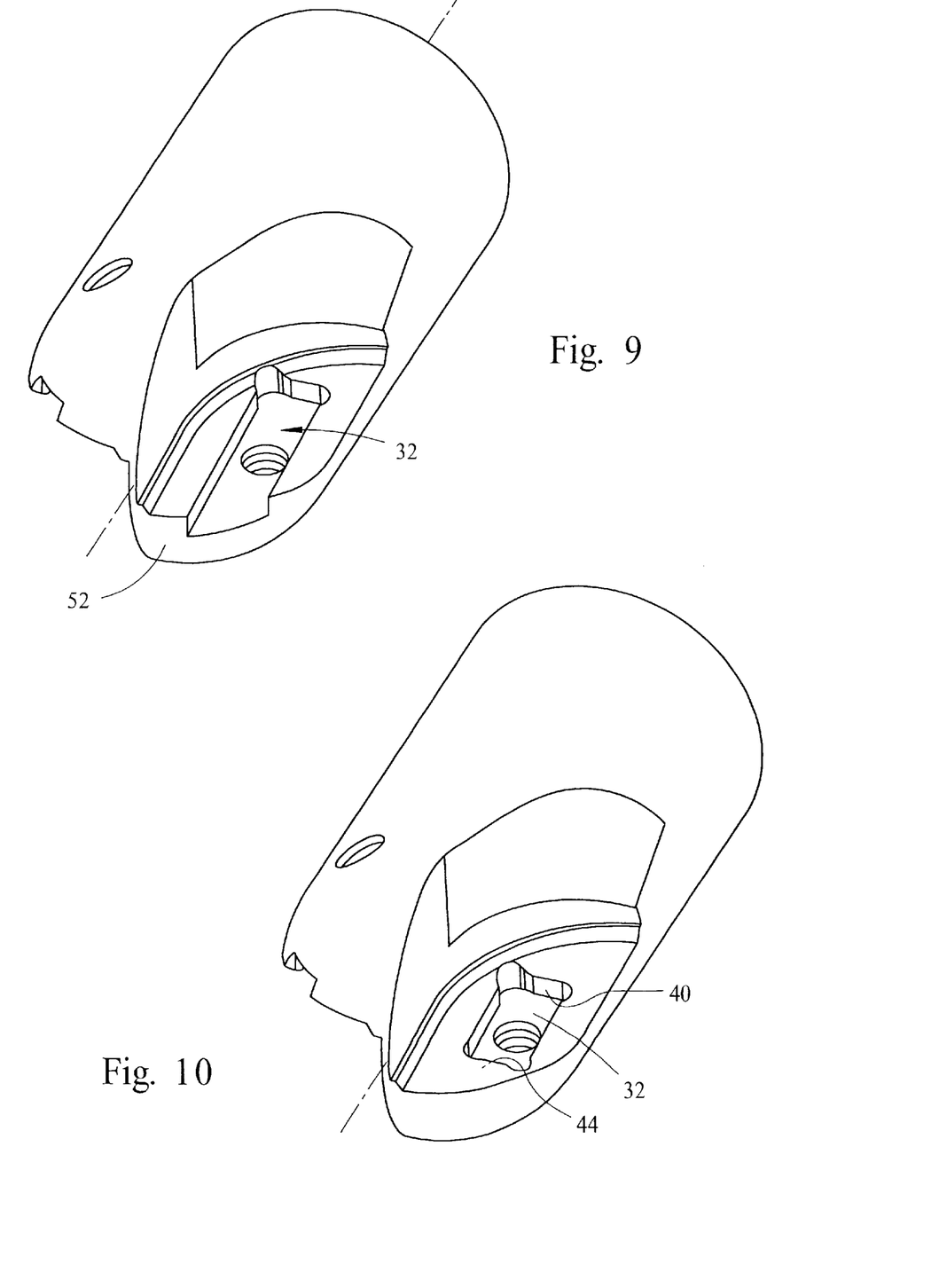
FIG. 9 is a perspective view of a modified version of a tool body according to the present invention.
FIG. 10 is a perspective view of a modified version of a tool body according to the present invention.

In situations where there are no forwardly directed axial forces applied on the cutting insert, or these forces are of a very small magnitude, the axial abutment surface 44 is not necessary. Such a case is shown in FIG. 9. As seen, the indentation 32 extends uniformly till the peripheral face 52 of the tool body 22. In this case, the indentation 32 is easier to produce than in the case shown in FIG. 2. Also, the cutting insert can be then slidably inserted from the front portion of the tool body into its pocket.

In situations where the forwardly directed axial forces applied on the cutting insert are of a large magnitude, it is preferable to increase the radial extent of the axial abutment surface 44. In FIG. 10, the axial abutment surface 44 has the same radial extent as the axial abutment surface 40 and the indentation 32 is completely enclosed by four side walls.

Figure 11:
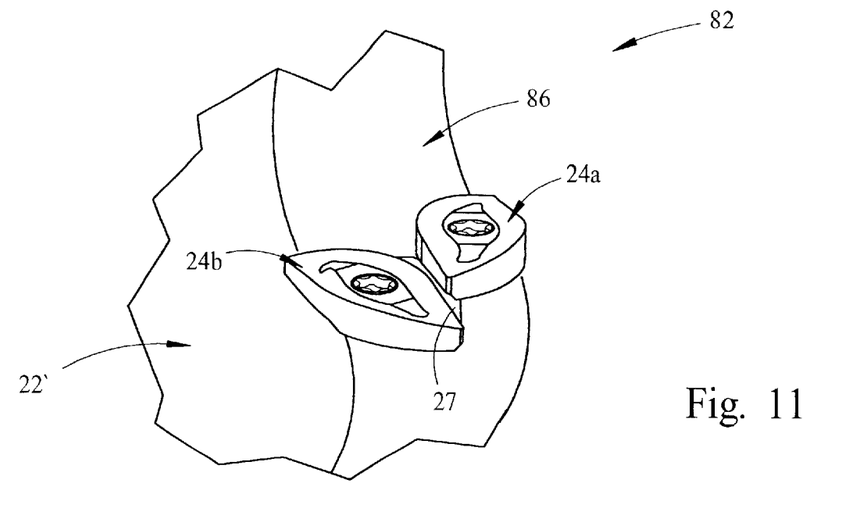
FIG. 11 is a perspective view of an alternative embodiment of a cutting tool according to the present invention.
Figure 12:
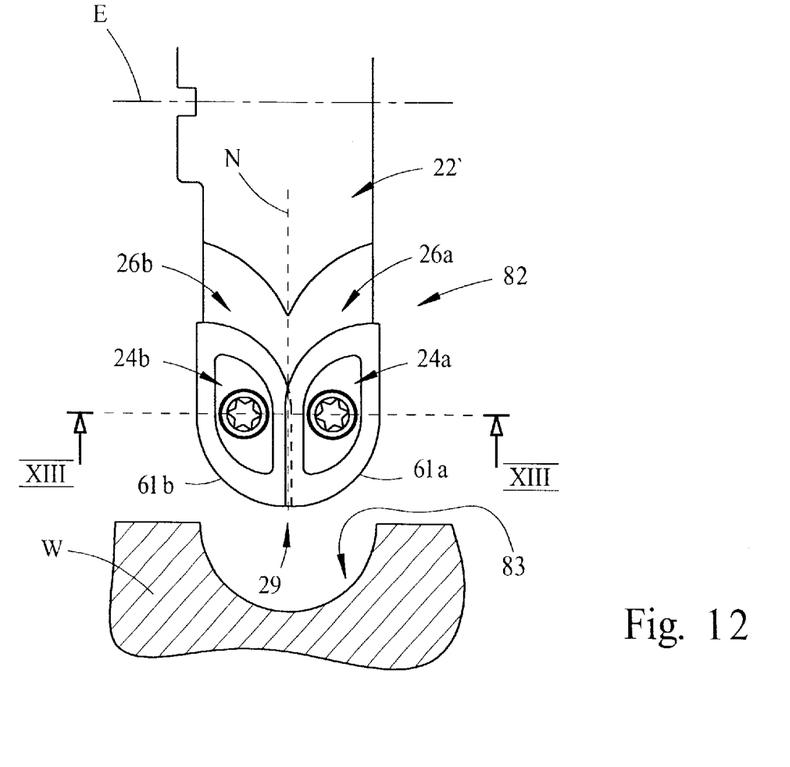
FIG. 12 is a top view of the cutting inserts shown in FIG. 11.
Figure 13:
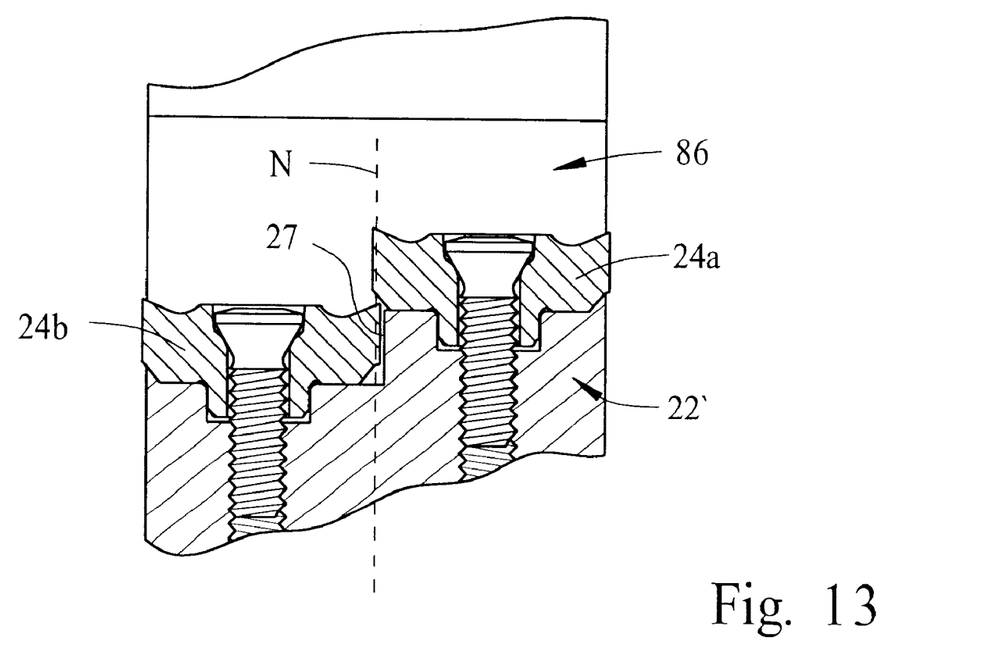
FIG. 13 is a cross-sectional view along line XIII—XIII in FIG. 12 taken along the axes of the clamping screws.

FIGS. 11–13 show another use of a cutting tool according to the present invention. As shown, two cutting inserts 24a and 24b are placed in the periphery of a cutting tool 82 having an axis of rotation E. The cutting insert 24a is right handed and the cutting insert 24b is left handed. The cutting inserts 24a and 24b are retained in the peripheral portion 29 of a tool body 22', one cutting insert adjacent the other, symmetrical with respect to a median plane N that constitutes a center line, and they both face the same direction. The two cutting inserts having mirror symmetry with respect to the center line in a top view of the cutting inserts. Despite the fact that the cutting inserts can be retained one adjacent the other since they both have sufficient radial support by the tool body 22', when it is desired to cut a 180° rounded slot the cutting inserts 24a and 24b are somewhat displaced one relative to the other in the rotation direction, as seen in FIGS. 11 and 13, so that they slightly overlap in a top view, as seen in FIG. 12. By way of this construction, the rounded portions 61a and 61b of the cutting edges of the respective cutting inserts 24a and 24b cut a 180° rounded profile, so that a "full effective" and "full profile" slotting cutter is obtained, enabling of milling a rounded groove 83 in a workpiece W. It is pointed out that the "full effective" attribute is obtained since the displacement between the cutting inserts 24a and 24b is relatively small so that they practically have a common chip gullet 86.

Although the present invention has been described to a certain degree of particularity, it should be understood that various alterations and modifications could be made without departing from the spirit or scope of the invention as hereinafter claimed. For example, the shape of the protuberance, can be of any form or number of sides, providing that the protuberance is retained within a corresponding indentation in the insert receiving pocket. The lateral walls of the protuberance do not have to be perpendicular to the base wall of the cutting insert, rather, they can form therebetween an angle between 70° to 110°. Accordingly, the side walls of the insert receiving pocket should be inclined in the same manner with respect to the pocket base wall.

What is claimed is:

1. A cutting tool (20, 82) comprising a tool body (22, 22') and two cutting inserts (24, 24a, 24b) mounted therein;
   the tool body having two insert receiving pockets (26, 26a, 26b) substantially symmetrically located with respect to a center line of the tool body, each of the two insert receiving pockets comprising:
   a pocket base wall (30),
   an indentation (32) opening to the base wall, the indentation having a lower wall (34) that is connected to at least three side walls, a first side wall (36) of said at least three side walls being substantially longitudinally directed with respect to the center line, a second side wall (38) of said at least three side walls being parallel to the first side wall and located more distantly relative to the first side wall with respect to the center line of the tool body, a third side wall (40) of said at least three side walls being transversely directed with respect to the first and second side walls,
   a threaded bore (54) extending through the lower wall (34) of the indentation (32);
   each of the two cutting inserts (24, 24a, 24b) comprising:
   a rake surface (62), an insert base wall (68) and a peripheral relief surface (63) connecting the rake surface and the base wall, and cutting edges (59, 60) defined between the rake and relief surfaces, a protuberance (69) extending downwardly from the insert base wall (68) and away from the rake surface (62), the protuberance having a lower wall (70) that is connected to four lateral walls, each lateral wall being connected to an adjacent lateral wall, the four lateral walls being connected to the insert base wall, a first lateral wall (72) of the four lateral walls being substantially longitudinally directed with respect to the center line, a second lateral wall (73) of said four lateral walls being parallel to the first lateral wall, a third lateral wall (74) of the four lateral walls being transversely directed with respect to the first and second lateral walls, a fourth lateral wall (75) of the four lateral walls being parallel to the third lateral wall, a through bore (58), having an axis (B), extending between the rake surface (62) and the lower wall (70);

each cutting insert is retained in a respective insert receiving pocket by a clamping screw (78) passing through the through bore (58) of the cutting insert and threadingly engaging the threaded bore (54), the insert base wall (68) abuts the pocket base wall (30) of the insert receiving pocket, the first lateral wall (72) of the protuberance abuts the first side wall (36) of the indentation (32), and the third lateral wall (74) of the protuberance (69) abuts the third side wall (40) of the indentation, in a cross section taken perpendicular to the center line and passing through the threaded bores, the first lateral wall of the protuberance is distanced from the center line by a first distance D1 and the cutting edges are distanced from the center line by a second distance D2 and a third distance D3, where the third distance D3 is greater than the second distance D2, where the first distance D1 is at least three times greater than the second distance D2, and where the relief surface (63) is relieved from the insert receiving pocket (26, 26a, 26b).

2. The cutting tool (20, 82) according to claim 1, wherein the indentation (32) of the insert receiving pocket (26) is bounded by the first, the second, the third and a fourth side walls (36, 38, 40, 44), the first and the second side walls (36, 38) are parallel to each other and substantially longitudinally directed with respect to the center line, the third and the fourth side walls (40, 44) are parallel to each other and transversely directed with respect to the first and second side walls.

3. The cutting tool (20) according to claim 1, wherein the two cutting inserts (24) are identical.

4. The cutting tool (20) according to claim 1, wherein the cutting tool having rotational symmetry with respect to the center line.

5. The cutting tool (82) according to claim 1, wherein the two cutting inserts (24a, 24b) having mirror symmetry with respect to the center line in a top view of the cutting inserts.

6. The cutting tool (20, 82) according to claim 1, wherein each cutting insert (24, 24a, 24b) has 180° rotational symmetry around the axis of the through bore (58).

7. The cutting tool (20, 82) according to claim 2, wherein the indentation (32) is completely enclosed by four side walls (36, 38, 40, 44).

8. The cutting tool (20, 82) according to claim 2, wherein the first and second lateral walls (72, 73) of the protuberance (69) are perpendicular to the third and fourth lateral walls (74, 75) of the protuberance and the first and second side walls of the indentation (32) are perpendicular to the third and fourth side walls of the indentation.

9. The cutting tool (20, 82) according to claim 2, wherein the first and second lateral walls (72, 73) of the protuberance are perpendicular to the insert base wall (68).

10. The cutting tool (20, 82) according to claim 2, wherein the third and fourth lateral walls (74, 75) of the protuberance are perpendicular to the insert base wall (68).

11. The cutting tool (20, 82) according to claim 2, wherein the first and second side walls (36, 38) of the indentation are perpendicular to the pocket base wall (30).

12. The cutting tool (20, 82) according to claim 2, wherein the third and fourth side walls (40, 44) of the indentation are perpendicular to the pocket base wall (30).

13. A tool body (22, 22') having two insert receiving pockets (26, 26a, 26b) substantially symmetrically located with respect to a center line of the tool body, each of the two insert receiving pockets comprising:

a pocket base wall (30), an indentation (32) opening to the base wall, the indentation having a lower wall (34) that is connected to at least three side walls, a first side wall (36) of said at least three side walls being substantially longitudinally directed with respect to the center line, a second side wall (38) of said at least three side walls being parallel to the first side wall and located more distantly relative to the first side wall with respect to the center line of the tool body, a third side wall (40) of said at least three side walls being transversely directed with respect to the first and second side walls; and a threaded bore (54) extending through the lower wall (34) of the indentation (32);

wherein the lower wall (34) of the indentation (32) fully surrounds the threaded bore (54) such that the pocket base wall (30) is uninterrupted by the threaded bore (54).

14. A tool body (22, 22') according to claim 13, wherein at least one of the insert receiving pockets having a pocket side wall (27) substantially parallel to the center line and adjacent thereto, in a cross section taken perpendicular to the center line and passing through the threaded bores, the first side wall (36) of the indentation (32) is distanced from the center line by a fourth distance D4 and the pocket side wall (27) is distanced from the center line a fifth distance D5, where the fourth distance D4 is at least three times greater than the fifth distance D5.

15. A tool body (22) according to claim 14, wherein the insert receiving pockets are rotationally symmetrical with respect to the center line.

16. A tool body (22') according to claim 14, wherein the insert receiving pockets having substantially mirror symmetry with respect to the center line in a top view of the insert receiving pockets.

17. A cutting insert (24, 24a, 24b) comprising:

a rake surface (62), an insert base wall (68) and a peripheral relief surface (63) connecting the rake surface and the base wall, and cutting edges (59, 60) defined between the rake and relief surfaces, a protuberance (69) extending downwardly from the insert base wall (68) and away from the rake surface (62), the protuberance having a lower wall (70) that is connected to four lateral walls, each lateral wall being connected to an adjacent lateral wall, the four lateral walls being connected to the insert base wall, a first lateral wall (72) of the four lateral walls being substantially longitudinally directed, a second lateral wall (73) of said four lateral walls being parallel to the first lateral wall, a third lateral wall (74) of the four lateral walls being transversely directed with respect to the first and second lateral walls, a fourth lateral wall (75) of the four lateral walls being parallel to the third lateral wall, and a through bore (58), having an axis (B), extending between the rake surface (62) and the lower wall (70);

wherein the lower wall (70) of the protuberance (69) fully surrounds the through bore (58) such that the insert base wall (68) is uninterrupted by the through bore (58); and wherein the cutting insert has 180° rotational symmetry around the axis of the through bore.

18. A cutting insert according to claim 17, wherein each of the cutting edges having a straight portion connected to a rounded portion.

19. The tool body according to claim 13, wherein the lower wall of the indentation is further connected to a fourth side wall, said fourth side wall being parallel to the third side wall.

20. The tool body according to claim 19, wherein the indentation is completely enclosed by the first, second, third and fourth side walls.

21. A ball nose end mill cutting tool assembly comprising:

a tool body having two insert receiving pockets substantially symmetrically located with respect to a center line of the tool body, each of the two insert receiving pockets comprising:

a pocket base wall, an indentation opening to the base wall, the indentation having a lower wall that is connected to at least three side walls, a first side wall of said at least three side walls being substantially longitudinally directed with respect to the center line, a second side wall of said at least three side walls being parallel to the first side wall and located more distantly relative to the first side wall with respect to the center line of the tool body, a third side wall of said at least three side walls being transversely directed with respect to the first and second side walls; and a threaded bore extending through the lower wall of the indentation, wherein the lower wall of the indentation fully surrounds the threaded bore such that the pocket base wall is uninterrupted by the threaded bore; and a cutting insert seated in each of the two insert receiving pockets, each cutting insert comprising:

a rake surface, an insert base wall and a peripheral relief surface connecting the rake surface and the base wall, and cutting edges defined between the rake and relief surfaces, a protuberance extending downwardly from the insert base wall and away from the rake surface, the protuberance having a lower wall that is connected to four lateral walls, each lateral wall being connected to an adjacent lateral wall, upper portions of the four lateral walls being connected to the insert base wall, a first lateral wall of the four lateral walls being substantially longitudinally directed, a second lateral wall of said four lateral walls being parallel to the first lateral wall, a third lateral wall of the four lateral walls being transversely directed with respect to the first and second lateral walls, a fourth lateral wall of the four lateral walls being parallel to the third lateral wall, and a through bore, having an axis (B), extending between the rake surface and the lower wall, wherein the lower wall of the protuberance fully surrounds the through bore such that the insert base wall is uninterrupted by the through bore.

22. The ball nose end mill cutting tool assembly according to claim 21, wherein the lower wall of the indentation is further connected to a fourth side wall, said fourth side wall being parallel to the third side wall.

23. The ball nose end mill cutting tool assembly according to claim 22, wherein the indentation is completely enclosed by the first, second, third and fourth side walls.

24. A ball nose end mill tool body (22, 22') having two insert receiving pockets (26, 26a, 26b) substantially symmetrically located with respect to a center line of the tool body, each of the two insert receiving pockets comprising:

a pocket base wall (30), an indentation (32) opening to the base wall, the indentation having a lower wall (34) that is connected to at least four side walls, a first side wall (36) of said at least four side walls being substantially longitudinally directed with respect to the center line, a second side wall (38) of said at least four side walls being parallel to the first side wall and located more distantly relative to the first side wall with respect to the center line of the tool body, a third side wall (40) of said at least four side walls being transversely directed with respect to the first and second side walls, and a fourth side wall (44) of said at least four side walls being parallel to the third side wall; and a threaded bore (54) extending through the lower wall (34) of the indentation (32).

25. The ball nose end mill tool body according to claim 24, wherein the lower wall of the indentation fully surrounds the threaded bore such that the pocket base wall is uninterrupted by the threaded bore.

26. The ball nose end mill tool body according to claim 24, wherein the indentation is completely enclosed by the first, second, third and fourth side walls.

27. A cutting insert (24, 24a, 24b) comprising:

a rake surface (62), an insert base wall (68) and a peripheral relief surface (63) connecting the rake surface and the base wall, and cutting edges (59, 60) defined between the rake and relief surfaces, a protuberance (69) extending downwardly from the insert base wall (68) and away from the rake surface (62), the protuberance having a lower wall (70) that is connected to four lateral walls, each lateral wall being connected to an adjacent lateral wall, upper portions of the four lateral walls being connected to the insert base wall such that the protuberance is completely surrounded by the insert base wall (68), a first lateral wall (72) of the four lateral walls being substantially longitudinally directed, a second lateral wall (73) of said four lateral walls being parallel to the first lateral wall, a third lateral wall (74) of the four lateral walls being transversely directed with respect to the first and second lateral walls, a fourth lateral wall (75) of the four lateral walls being parallel to the third lateral wall, and a through bore (58), having an axis (B), extending between the rake surface (62) and the lower wall (70);

wherein the cutting insert has 180° rotational symmetry around the axis of the through bore.

28. The cutting insert according to claim 27, wherein the lower wall of the protuberance fully surrounds the through bore such that the insert base wall is uninterrupted by the through bore.

29. A ball nose end mill cutting tool assembly comprising:
a tool body (22, 22') having two insert receiving pockets (26, 26a, 26b) substantially symmetrically located with respect to a center line of the tool body, each of the two insert receiving pockets comprising:
- a pocket base wall (30),
- an indentation (32) opening to the base wall, the indentation having a lower wall (34) that is connected to at least four side walls, a first side wall (36) of said at least four side walls being substantially longitudinally directed with respect to the center line, a second side wall (38) of said at least four side walls being parallel to the first side wall and located more distantly relative to the first side wall with respect to the center line of the tool body, a third side wall (40) of said at least four side walls being transversely directed with respect to the first and second side walls, and a fourth side wall (44) of said at least four side walls being parallel to the third side wall; and
- a threaded bore (54) extending through the lower wall (34) of the indentation (32); and a cutting insert (24, 24a, 24b) seated in each of the two insert receiving pockets, each cutting insert comprising:
- a rake surface (62), an insert base wall (68) and a peripheral relief surface (63) connecting the rake surface and the base wall, and cutting edges (59, 60) defined between the rake and relief surfaces,
- a protuberance (69) extending downwardly from the insert base wall (68) and away from the rake surface (62), the protuberance having a lower wall (70) that is connected to four lateral walls, each lateral wall being connected to an adjacent lateral wall, upper portions of the four lateral walls being connected to the insert base wall such that the protuberance is completely surrounded by the insert base wall (68), a first lateral wall (72) of the four lateral walls being substantially longitudinally directed, a second lateral wall (73) of said four lateral walls being parallel to the first lateral wall, a third lateral wall (74) of the four lateral walls being transversely directed with respect to the first and second lateral walls, a fourth lateral wall (75) of the four lateral walls being parallel to the third lateral wall, and
- a through bore (58), having an axis (B), extending between the rake surface (62) and the lower wall (70).

30. The ball nose end mill cutting tool assembly according to claim 29, wherein the lower wall of the protuberance fully surrounds the through bore such that the insert base wall is uninterrupted by the through bore; and
the lower wall of the indentation fully surrounds the threaded bore such that the pocket base wall is uninterrupted by the threaded bore.

31. The ball nose end mill cutting tool assembly according to claim 29, wherein the indentation is completely enclosed by the first, second, third and fourth side walls.

* * * * *